US011872850B2

United States Patent
Sams (10) Patent No.: US 11,872,850 B2
(45) Date of Patent: Jan. 16, 2024

(54) SYSTEM AND METHOD FOR TIRE VERTICAL LOAD PREDICTION

(71) Applicant: BRIDGESTONE AMERICAS TIRE OPERATIONS, LLC, Nashville, TN (US)

(72) Inventor: Thomas A. Sams, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

(21) Appl. No.: 18/266,804

(22) PCT Filed: Jan. 6, 2022

(86) PCT No.: PCT/US2022/070053
§ 371 (c)(1),
(2) Date: Jun. 12, 2023

(87) PCT Pub. No.: WO2022/150823
PCT Pub. Date: Jul. 14, 2022

(65) Prior Publication Data
US 2023/0391143 A1     Dec. 7, 2023

Related U.S. Application Data

(60) Provisional application No. 63/134,244, filed on Jan. 6, 2021.

(51) Int. Cl.
*B60C 11/24*     (2006.01)
*B60C 23/04*     (2006.01)
(52) U.S. Cl.
CPC ............ *B60C 11/246* (2013.01); *B60C 23/04* (2013.01)
(58) Field of Classification Search
CPC ........................... B60C 11/246; B60C 23/04
See application file for complete search history.

(56) References Cited

U.S. PATENT DOCUMENTS 7,404,317 B2    7/2008  Mancosu et al.
8,844,346 B1    9/2014  Singh et al.
(Continued)

FOREIGN PATENT DOCUMENTS

CN    103786533 B    6/2016
JP       6235599 B2   11/2017

OTHER PUBLICATIONS

Wang, Guolin, Jianjun Wu, and Meilin Zhu. "Finite element analysis of tire thermomechanical coupling rolling resistance." 2011 International Conference on Electric Information and Control Engineering. IEEE, 2011. (Year: 2011).*

(Continued)

*Primary Examiner* — Russell Frejd
*Assistant Examiner* — Ana D Thomas (57) ABSTRACT

A computer-implemented method as disclosed enables predicting of vertical loads on a vehicle tire. Thermal characteristics for a particular vehicle-tire combination are retrievably stored, the thermal characteristics determined as corresponding to a range of temperature values further correlated with a plurality of operating conditions, and the plurality of operating conditions comprising at least a vertical load. A model for predicting transient temperature behavior is generated (e.g., empirically trained) based on one or more tire-specific time constants. During operation of the vehicle-tire combination and responsive to at least a first temperature value, a computing device residing on the vehicle or otherwise cloud-based in nature is configured to determine a predicted vertical load based on a predicted second temperature value from the model and further based on the retrievably stored one or more thermal characteristics.

20 Claims, 3 Drawing Sheets

(56) References Cited

U.S. PATENT DOCUMENTS

| | | | |
|---|---|---|---|
| 9,120,356 | B2 | 9/2015 | Patel et al. |
| 9,874,496 | B2 | 1/2018 | Singh |
| 2004/0068391 | A1 | 4/2004 | Futamura et al. |
| 2014/0067193 | A1 | 3/2014 | Gokyu et al. |
| 2014/0114558 | A1 | 4/2014 | Singh et al. |
| 2015/0360525 | A1* | 12/2015 | Singh .................... G01K 13/08 |
| | | | 374/141 |
| 2017/0355234 | A1 | 12/2017 | Dharamshi et al. |
| 2020/0062268 | A1* | 2/2020 | Steiner .................... B60S 40/13 |
| | | | 701/29.1 |

OTHER PUBLICATIONS

Huang, Haibo, and Gang Zhang. "Modeling and Numerical Simulation for Tire Irregular Wear Caused by Tread Vibration." 2010 Second International Conference on Computer Modeling and Simulation. vol. 3. IEEE, 2010. (Year: 2010).*

Clifford Atiyeh, "Pirelli is Launching Smart Tires That Can Monitor Wear and Load", Car and Driver, Jul. 17, 2018, https://www.caranddriver.com/news/a22255767/pirelli-is-launching-smart-tires-that-can-monitor-wear-and-load/, Accessed Mar. 18, 2020.

A.A. J. C. Schmeitz and A. P. Teerhuis, "Robustness and Applicability of a Model-Based Tire State Estimator for an Intelligent Tire", Tire Science and Technology: Apr.-Jun. 2018, vol. 46, No. 2, pp. 105-126, https://tiresciencetechnology.org/doi/abs/10.2346/tire.18.460204, accessed Mar. 18, 2020.

International Search Report, corresponding application No. PCT/US2022/070053, dated Apr. 22, 2022, 3 pages.

* cited by examiner

SYSTEM AND METHOD FOR TIRE VERTICAL LOAD PREDICTION

FIELD OF THE DISCLOSURE

The present disclosure relates generally to tire wear prediction and monitoring systems for wheeled vehicles.

More particularly, systems, methods, and related algorithms as disclosed herein may be implemented for predicting vertical load as a key aspect of tire wear prediction for, e.g., tires of wheeled vehicles including but not limited to motorcycles, consumer vehicles (e.g., passenger and light truck), commercial and off-road (OTR) vehicles.

BACKGROUND

Prediction of certain performance measurements such as for example tire wear and/or durability is an important tool for anyone owning or operating vehicles, particularly in the context of fleet management. As tires are used, it is normal for the tread to gradually become shallower and overall tire performance to change. At a certain point it becomes critical to be aware of the tire conditions, as insufficient tire tread can create unsafe driving conditions. For example, when road conditions are non-optimal the tires may be unable to grip the road and a driver may lose control of his or her vehicle. Generally stated, the shallower the tire tread, the more easily the driver may lose traction when driving in rain, snow, or the like.

In addition, irregular tread wear may occur for a variety of reasons that may lead users to replace a tire sooner than would otherwise have been necessary. Vehicles, drivers, and individual tires are all different from each other, and can cause tires to wear at very different rates. For instance, high performance tires for sports cars wear more quickly than touring tires for a family sedan. However, a wide variety of factors can cause a tire to wear out sooner than expected, and/or cause it to wear irregularly and create noise or vibration. Two common causes of premature and/or irregular tire wear are improper inflation pressure and out-of-spec alignment conditions.

Typical on-vehicle sensor measurements for a vehicle such as a heavy truck may include vehicle speed, ambient temperature, tire inflation pressure, and tire contained air temperature (CAT). These measurements are all vital when extending them to higher order predictions such as wear and durability. However, one of the most important pieces of information is still missing—the vertical load on the tire, conventional sensors for which may be prohibitively expensive and/or unreliable.

BRIEF SUMMARY

A system and associated methodology as disclosed herein may accurately and reliably enable tire vertical load prediction based on the aforementioned typical sensor measurements (e.g., vehicle speed, ambient temperature, inflation pressure, and CAT).

An exemplary embodiment of a computer-implemented method as disclosed herein for predicting vertical load on a vehicle tire includes a preliminary step of retrievably storing one or more thermal characteristics for a particular vehicle-tire combination, the thermal characteristics determined as corresponding to a range of temperature values further correlated with a plurality of operating conditions, the plurality of operating conditions comprising at least a vertical load. The method further includes generating (e.g., empirically training) a model for predicting transient temperature behavior based on one or more tire-specific time constants. During operation of the vehicle-tire combination and responsive to at least a first temperature value, the method further includes determining a predicted vertical load based on a predicted second temperature value from the model and further based on the retrievably stored one or more thermal characteristics.

In one exemplary aspect in accordance with the above-referenced embodiment, the plurality of operating conditions further comprise vehicle speed and tire inflation pressure, and the predicted vertical load is determined further based on inputs for vehicle speed and tire inflation pressure.

In another exemplary aspect in accordance with the above-referenced embodiment, the at least first temperature value comprises a tire contained air temperature sensed via a tire-mounted sensor.

In another exemplary aspect in accordance with the above-referenced embodiment, the retrievably stored thermal characteristics are determined via a series of physical measurements of the range of temperature values and the correlated plurality of operating conditions.

In another exemplary aspect in accordance with the above-referenced embodiment, the retrievably stored thermal characteristics are determined via finite element modeling of the vehicle-tire combination.

In another exemplary aspect in accordance with the above-referenced embodiment, the one or more tire-specific time constants comprises a first time constant corresponding to a cooling state of the tire and a second time constant corresponding to a heating state of the tire.

In another exemplary aspect in accordance with the above-referenced embodiment, the second temperature value may be predicted at least in part by selecting the first time constant or the second time constant based on at least a determined vehicle speed.

In another exemplary aspect in accordance with the above-referenced embodiment, the predicted vertical load may be implemented as an input to a tire wear prediction model.

In another exemplary aspect in accordance with the above-referenced embodiment, a replacement time for the tire may be predicted based on a predicted tire wear status, as compared with one or more tire wear thresholds associated with the tire. The one or more tire wear thresholds may comprise a tire tread threshold corresponding to a given wheel position for the vehicle-tire combination. Alternatively, or in addition, a vehicle maintenance alert may be generated comprising the predicted replacement time and an identifier associated with the vehicle-tire combination, and a message comprising the vehicle maintenance alert is transmitted to a fleet management device.

In another embodiment, a system is disclosed herein for predicting vertical load on a vehicle tire, and comprises a data storage network having one or more thermal characteristics for a particular vehicle-tire combination retrievably stored thereon, the thermal characteristics determined as corresponding to a range of temperature values further correlated with a plurality of operating conditions, the plurality of operating conditions comprising at least a vertical load. A computing device and an algorithmic model and further provided, and configured to direct the performance of steps according to the above-referenced method and any of the associated exemplary aspects.

The computing device may for example be mounted or otherwise positioned in the vehicle.

The computing device may alternatively be a mobile computing device carried by a driver or other user associated with the vehicle.

The computing device may still further refer to a remote server (e.g., cloud server) network, or even distributing computing platforms wherein certain operations are performed by one or more devices associated with the vehicle and other operations are performed by a remote server.

Unless otherwise defined, all technical and scientific terms used herein have the same meaning as commonly understood by one of ordinary skill in the art to which this invention belongs. An invention as disclosed herein may be embodied in other specific forms without departing from the spirit or essential attributes thereof, and it is therefore desired that the various embodiments be considered in all aspects as illustrative and not restrictive. Any headings utilized in the description are for convenience only and no legal or limiting effect.

Numerous objects, features and advantages of the embodiments set forth herein will be readily apparent to those skilled in the art upon reading of the following disclosure when taken in conjunction with the accompanying drawings.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Referring generally to FIGS. 1-4, various exemplary embodiments of a system and method may now be described in detail. Where the various figures may describe embodiments sharing various common elements and features with other embodiments, similar elements and features are given the same reference numerals and redundant description thereof may be omitted below.

Various embodiments of a system as disclosed herein may include centralized computing nodes (e.g., a cloud server) in functional communication with a plurality of distributed data collectors and computing nodes (e.g., associated with individual vehicles) for effectively implementing predictive models as disclosed herein.

Figure 1:
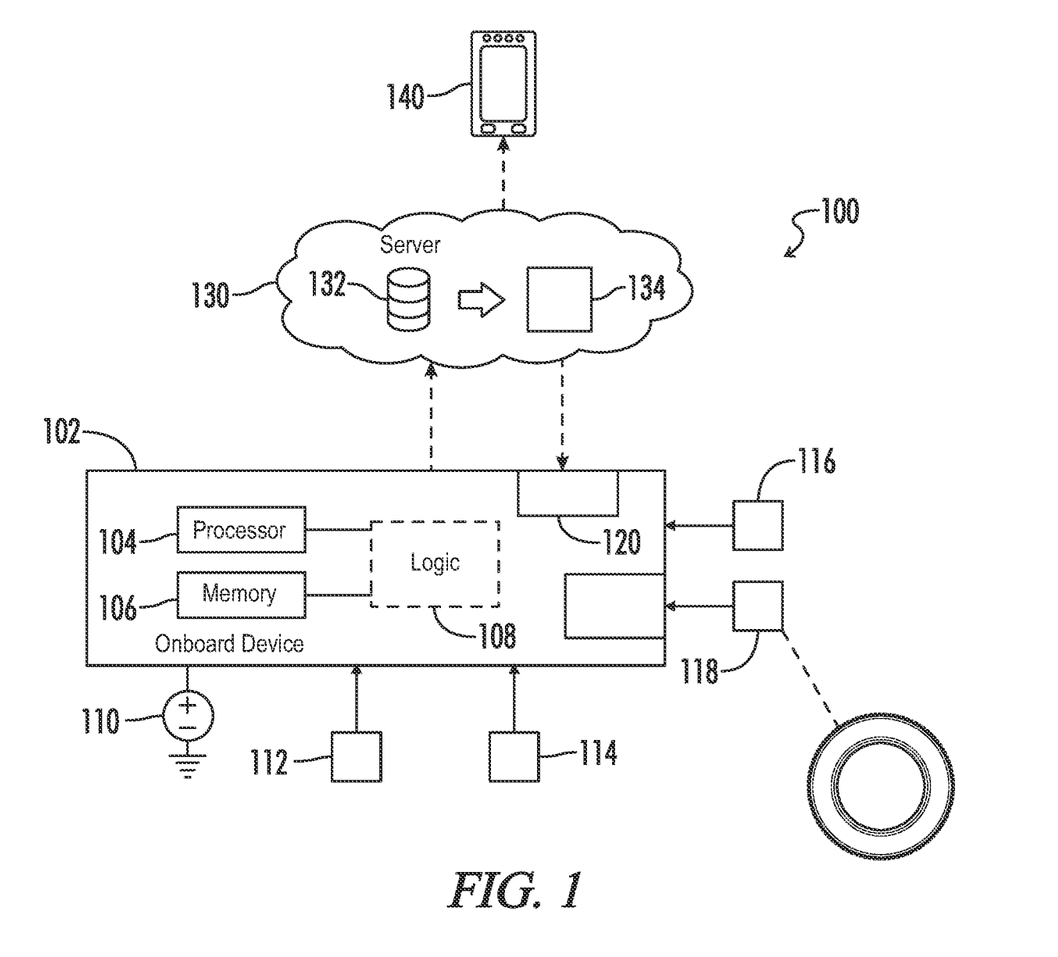
FIG. 1 is a block diagram representing an embodiment of a system for vertical load prediction as disclosed herein.

Referring initially to FIG. 1, an exemplary embodiment of the system 100 includes a computing device 102 that is onboard a vehicle and configured to at least obtain data and transmit said data to a remote server 130 and/or perform relevant computations as disclosed herein. The computing device may be portable or otherwise modular as part of a distributed vehicle data collection and control system (as shown), or otherwise may be integrally provided with respect to a central vehicle data collection control system (not shown). The device may include a processor 104 and memory 106 having program logic 108 residing thereon. The computing device 102 in various embodiments may be part of a vehicle electronic control unit (ECU) or otherwise may be discrete in nature, for example permanently or detachably provided with respect to a vehicle mount.

Generally stated, a system as disclosed herein may implement numerous components distributed across one or more vehicles, for example but not necessarily associated with a fleet management entity, and further a central server or server network in functional communication with each of the vehicles via a communications network. The vehicle components may typically include one or more sensors such as, e.g., vehicle body accelerometers, gyroscopes, inertial measurement units (IMU), position sensors such as global positioning system (GPS) transponders 112, tire pressure monitoring system (TPMS) sensor transmitters 118 and associated onboard receivers, or the like, as linked for example to a controller area network (CAN) bus network and providing signals thereby to local processing units. The illustrated embodiment includes for illustrative purposes, without otherwise limiting the scope of the present invention thereby, an ambient temperature sensor 116, a vehicle speed sensor 114 configured to collect for example acceleration data associated with the vehicle, and a DC power source 110. One or more of the sensors as disclosed herein may be integrated or otherwise collectively located in a given modular structure as opposed to being discrete and decentralized in structure. For example, a tire-mounted TPMS sensor as referred to herein may be configured to generate output signals corresponding to each of a plurality of tire-specific conditions (e.g., acceleration, pressure, contained air temperature).

Various bus interfaces, protocols, and associated networks are well known in the art for the communication between the respective data source and the local computing device, and one of skill in the art would recognize a wide range of such tools and means for implementing the same.

It should be noted that the embodiment represented in FIG. 1 is not limiting on the scope of a system or method as disclosed herein, and that in alternative embodiments the models generally, and more particularly the vertical load prediction and any associated tire wear estimations, may be implemented locally at the onboard computing device 102 rather than at the server level. For example, models 134 may be generated and trained over time at the server level, and downloaded to the onboard computing device 102 for local execution of one or more steps or operations as disclosed herein.

In other alternative embodiments, one or more of the various sensors 112, 114, 116, 118 may be configured to communicate directly with the remote server 130, or via a mobile computing device (not shown) carried by a user of the vehicle, rather than via the onboard computing device 102.

The system may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device in some embodiments being functionally linked to the onboard device via a communications network. System programming information may for example be provided on-board by the driver or from a fleet manager.

Vehicle and tire sensors may in an embodiment further be provided with unique identifiers, wherein the onboard device processor 104 can distinguish between signals provided from respective sensors on the same vehicle, and further in certain embodiments wherein a central server 130 and/or fleet maintenance supervisor client device 140 may distinguish between signals provided from tires and associated vehicle and/or tire sensors across a plurality of vehicles. In other words, sensor output values may in various embodiments be associated with a particular tire, a particular vehicle, and/or a particular tire-vehicle system for the purposes of onboard or remote/downstream data storage and implementation for calculations as disclosed herein. The onboard device processor may communicate directly with the hosted server as shown in FIG. 1, or alternatively the driver's mobile device or truck-mounted computing device may be configured to receive and process/transmit onboard device output data to the hosted server and/or fleet management server/device.

Signals received from a particular vehicle and/or tire sensor may be stored in onboard device memory, or an equivalent data storage network functionally linked to the onboard device processor, for selective retrieval as needed for calculations according to the method disclosed herein. A "data storage network" as used herein may refer generally to individual, centralized, or distributed logical and/or physical entities configured to store data and enable selective retrieval of data therefrom, and may include for example but without limitation a memory, look-up tables, files, registers, databases, and the like. In some embodiments, raw data signals from the various signals may be communicated substantially in real time from the vehicle to the server. Alternatively, particularly in view of the inherent inefficiencies in continuous data transmission of high frequency data, the data may for example be compiled, encoded, and/or summarized for more efficient (e.g., periodic time-based or alternatively defined event-based) transmission from the vehicle to the remote server via an appropriate communications network.

The vehicle data and/or tire data, once transmitted via a communications network to the hosted server 130, may be stored for example in a database 132 associated therewith. The server may include or otherwise be associated with one or more algorithmic models 134 as disclosed herein for selectively retrieving and processing the vehicle data and/or tire data as appropriate inputs. The models may be implemented at least in part via execution of a processor, enabling selective retrieval of the vehicle data and/or tire data and further in electronic communication for the input of any additional data or algorithms from a database, lookup table, or the like that is stored in association with the server.

The system 100 may include additional distributed program logic such as for example residing on a fleet management server or other user computing device 140, or a user interface of a device resident to the vehicle or associated with a driver thereof (not shown) for real-time notifications (e.g., via a visual and/or audio indicator), with the fleet management device 140 in some embodiments being functionally linked to the onboard device 102 via a communications network. System programming information may for example be provided on-board by the driver or from a fleet manager.

Of particular relevance with respect to certain algorithms and methods as disclosed herein, as previously noted one or more sensors associated with the system may include tire pressure monitoring system (TPMS) sensors 118 as are often currently included, e.g., on certain heavy-duty trucks. An example of a conventional TPMS includes a sensor transmitter functionally linked to a TPMS receiver, itself further linked to a data processing unit. The TPMS sensor transmitter may be provided in the interior air cavity of each tire of a vehicle on either a tire wheel or an inner surface of the tire. The transmitter may detect an internal pressure and a contained air temperature of the tire at predetermined time intervals, and wirelessly transmits corresponding values along with a unique identifier associated with the tire to the receiver. The transmitter may for example be mounted on a wheel rim so as to be integral with a tire valve. Alternatively, the transmitter may be attached to an inner surface of the tire. The receiver further relays the signals from the transmitter to the data processing unit via a communication means such as for example Bluetooth.

The contained air temperature is affected by several factors. Tire deflection produces heat, which causes the contained air temperature to rise. More load on the tire increases the deflection, which causes more heat to be produced, causing the contained air temperature to rise higher. Turning, braking and acceleration will also cause more tire deflection (in addition to more heat from friction between the tire and the road), causing more heat to be produced, causing the contained air temperature to rise higher.

Figure 2:
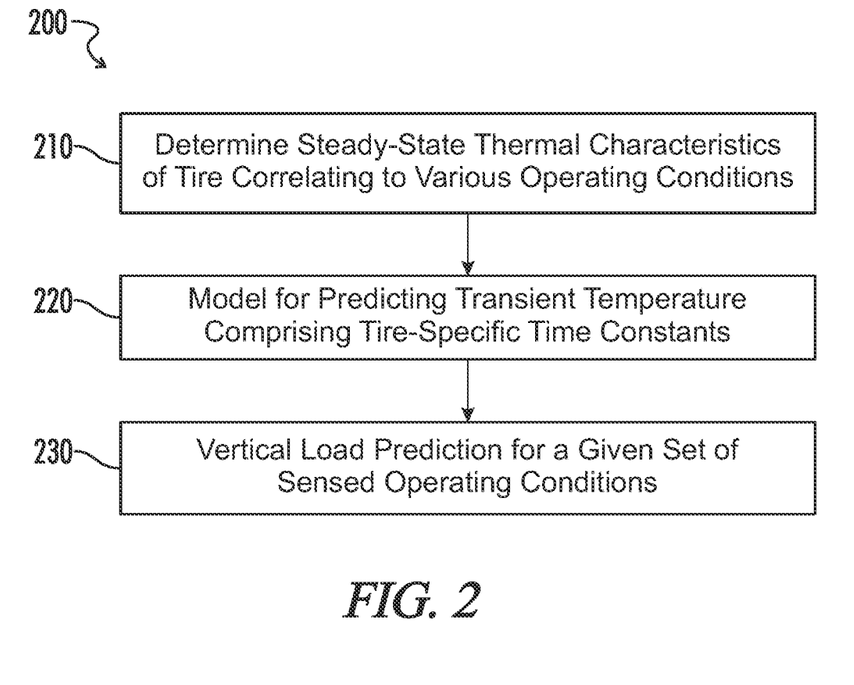
FIG. 2 is a flowchart representing an embodiment of a method for vertical load prediction as disclosed herein.

Referring to FIG. 2, a method 200 as further described herein relates to the prediction of vertical load on the tire from several of the aforementioned typical sensor measurements (e.g., speed, ambient temperature, inflation pressure, and CAT).

In one step 210, a tire's thermal characteristics (e.g., steady-state thermal characteristics) are determined as correlating with various operating conditions. In various embodiments, this determination can be made via physical measurements, or alternatively via finite element analysis, other equivalent techniques, or a mix thereof. In an exemplary embodiment, the steady-state contained air temperature is determined at several different vertical loads, speeds, and inflation pressures. All of these conditions are then compiled into one parameter, which is the vertical load multiplied by the speed (essentially a power input to the tire) divided by the inflation pressure.

Figure 3:
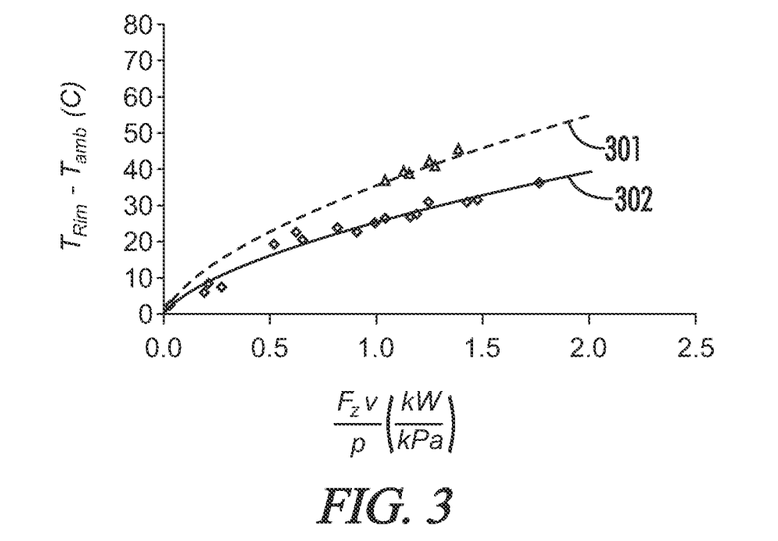
FIG. 3 is a graphical diagram including data points and curves representing exemplary thermal characteristics of a tire.

FIG. 3 shows two examples of data curves, with a first curve 301 produced via outdoor testing results from physical measurements, and a second curve 302 produced via finite element analysis simulations. The data as represented in the present embodiment take the form $\Delta T = A*(Fz*v/p)^b$, where $\Delta T$ is the difference between CAT (or $T_{rim}$) and ambient temperature (or $T_{amb}$), F is the vertical load, v is the vehicle speed, p is the tire's inflation pressure, and A and b are coefficients to be determined. For the exemplary curve 301, coefficient A is determined to be 25 and coefficient b is determined to be 0.65. For the exemplary curve 302, coefficient A is determined to be 35 and coefficient b is determined to be 0.65.

In another step 320, in order to predict transient temperature, the tire may be treated as a lumped capacitance model, wherein for example the only parameter needed is $\tau$, a time constant. This time constant $\tau$ may be different depending on whether the tire is heating or cooling. As one example, based on limited data gathered from truck and bus radial (TBR) tires of size 295/75R22.5 R283, the cooling time constant $\tau_{cool}$ is determined to be 2500 seconds, and the heating time constant $\tau_{heat}$ is determined to be 1250 seconds. One of skill in the art may appreciate that these time constants will likely vary from tire to tire, especially for tires of different sizes, and therefore these constants would need to be determined from experimental data.

Figure 4:
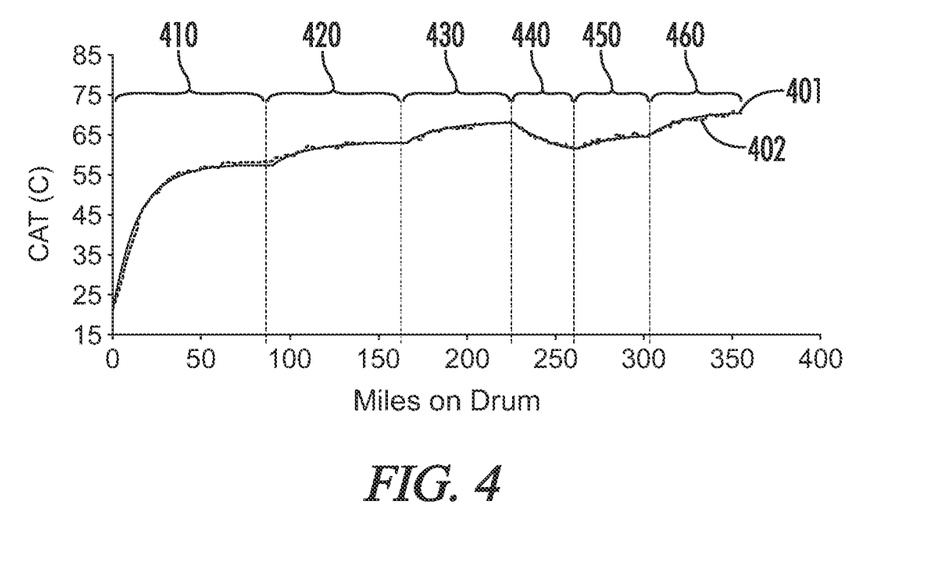
FIG. 4 is a graphical diagram representing an exemplary comparison of predicted contained air temperature (CAT) versus measured CAT for a controlled indoor drum test where a measured vehicle speed and a vertical load are variable.

FIG. 4 represents a comparison of predicted contained air temperature 401 with respect to measured contained air temperature 402 for a controlled indoor drum test with variance in both of the speed and the vertical load. In a first block of test mileage 410, the speed is 40 miles per hour (mph) and the load is 6173 pounds of force (lbf). In a second block of test mileage 420, the speed is 50 mph and the load is 6173 lbf. In a third block of test mileage 430, the speed is 60 mph and the load is 6173 lbf. In a fourth block of test mileage 440, the speed is 40 mph and the load is 6614 lbf. In a fifth block of test mileage 450, the speed is 50 mph and the load is 6614 lbf. In a sixth block of test mileage 460, the speed is 60 mph and the load is 6614 lbf.

When a TPMS device 118 is implemented as previously noted, the contained air temperature measurements 402 may typically be directly obtained therefrom. This allows for the previously stated model to be used to predict the unknown variable, i.e., vertical load. For the embodiment shown in FIG. 4, if this method is applied, the vertical loads are predicted within 120N of the actual value. One of skill in the art may appreciate that this data can be very sparse and/or noisy when viewed instantaneously with respect to vehicle conditions, but that the noise may be filtered or otherwise minimized via smoothed analysis over larger periods of time, such as for example over a 24-hour period for a long haul truck route. This may appreciably impact the capability of a typical system to more accurately predict wear and durability.

Various tire wear values may be estimated based on, e.g., "digital twin" virtual representations of various physical parts, processes or systems wherein digital and physical data is paired and combined with learning systems such as for example neural networks. For example, real data from a vehicle and associated location/route information may be provided to generate a digital representation of the vehicle tire for estimation of tire wear, wherein subsequent comparison of the estimated tire wear with a determined actual tire wear may be implemented as feedback for the machine learning algorithms. The wear model may be implemented at the vehicle, for processing via the onboard system, or the tire data and/or vehicle data may be processed to provide representative data to the hosted server for remote wear estimation.

The tire wear status (e.g., tread depth) may for example be provided along with certain vehicle data as inputs to a traction model, which may be configured to provide an estimated traction status or one or more traction characteristics for the respective tire. As with the aforementioned wear model, the traction model may comprise "digital twin" virtual representations of physical parts, processes or systems wherein digital and physical data are paired and combined with learning systems such as for example artificial neural networks. Real vehicle data and/or tire data from a particular tire, vehicle or tire-vehicle system may be provided throughout the life cycle of the respective asset to generate a virtual representation of the vehicle tire for estimation of tire traction, wherein subsequent comparison of the estimated tire traction with a corresponding measured or determined actual tire traction may preferably be implemented as feedback for machine learning algorithms executed at the server level.

The traction model may in various embodiments utilize the results from prior testing, including for example stopping distance testing results, tire traction testing results, etc., as collected with respect to numerous tire-vehicle systems and associated combinations of values for input parameters (e.g., tire tread, inflation pressure, road surface characteristics, vehicle speed and acceleration, slip rate and angle, normal force, braking pressure and load), wherein a tire traction output may be effectively predicted for a given set of current vehicle data and tire data inputs.

In one embodiment, outputs from this traction model may be incorporated into an active safety system. The term "active safety systems" as used herein may preferably encompass such systems as are generally known to one of skill in the art, including but not limited to examples such as collision avoidance systems, advanced driver-assistance systems (ADAS), anti-lock braking systems (ABS), etc., which can be configured to utilize the traction model output information to achieve optimal performance. For example, collision avoidance systems are typically configured to take evasive action, such as automatically engaging the brakes of a host vehicle to avoid or mitigate a potential collision with a target vehicle, and enhanced information regarding the traction capabilities of the tires and accordingly the braking capabilities of the tire-vehicle system are eminently desirable.

In another embodiment, a ride-sharing autonomous fleet could use output data from the traction model to disable or otherwise selectively remove vehicles with low tread depth from use during inclement weather, or potentially to limit their maximum speeds.

In various embodiments, the method may further involve comparing a current wear value with respect to a threshold value to determine whether (or when) the tire requires replacement. The method may alternatively or further include predicting wear values at one or more future points in time, wherein such predicted values may be compared to respective threshold values. As represented for example in FIG. 1, a feedback signal corresponding to the predicted tire wear status (e.g., predicted tread depth at a given distance, time, or the like) may be provided via an interface 120 to an onboard device 102 associated with the vehicle itself, or to a mobile device 140 associated with a user, such as for example integrating with a user interface configured to provide alerts or notice/recommendations that a tire should or soon will need to be replaced.

As another example, an autonomous vehicle fleet may comprise numerous vehicles having varying minimum tread status values, wherein the fleet management system may be configured to disable deployment of vehicles falling below a minimum threshold. The fleet management system may further implement varying minimum tread status values corresponding to wheel positions. The system may accordingly be configured to act upon a minimum tire tread value for each of a plurality of tires associated with a vehicle, or in an embodiment may calculate an aggregated tread status for the plurality of tires for comparison against a minimum threshold.

In various embodiments the method may further include data streaming even where threshold violations are not detected, wherein estimated and/or predicted wear values can be displayed in real-time on the local user interface and/or a remote display (e.g., associated with the fleet management server), and further displayed data may include, e.g., the contained air temperature.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Whereas certain preferred embodiments of the present invention may typically be described herein with respect to tire wear estimation for fleet management systems and more particularly for autonomous vehicle fleets or commercial trucking applications, the invention is in no way expressly limited thereto and the term "vehicle" as used herein unless otherwise stated may refer to an automobile, truck, or any equivalent thereof, whether self-propelled or otherwise, as may include one or more tires and therefore require accurate estimation or prediction of tire wear and potential disabling, replacement, or intervention in the form of for example direct vehicle control adjustments.

The term "user" as used herein unless otherwise stated may refer to a driver, passenger, mechanic, technician, fleet management personnel, or any other person or entity as may be, e.g., associated with a device having a user interface for providing features and steps as disclosed herein.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for predicting vertical load on a vehicle tire, the method comprising:
retrievably storing one or more thermal characteristics for a particular vehicle-tire combination, the thermal characteristics determined as corresponding to a range of temperature values further correlated with a plurality of operating conditions, the plurality of operating conditions comprising at least a vertical load;
generating a model for predicting transient temperature behavior based on one or more tire-specific time constants; and
during operation of the vehicle-tire combination and responsive to at least a first temperature value, determining a predicted vertical load based on a predicted second temperature value from the model and further based on the retrievably stored one or more thermal characteristics.

2. The computer-implemented method according to claim 1, wherein the plurality of operating conditions further comprise vehicle speed and tire inflation pressure, and the predicted vertical load is determined further based on inputs for vehicle speed and tire inflation pressure.

3. The computer-implemented method according to claim 2, wherein the at least first temperature value comprises a tire contained air temperature sensed via a tire-mounted sensor.

4. The computer-implemented method according to claim 3, wherein the retrievably stored thermal characteristics are determined via a series of physical measurements of the range of temperature values and the correlated plurality of operating conditions.

5. The computer-implemented method according to claim 3, wherein the retrievably stored thermal characteristics are determined via finite element modeling of the vehicle-tire combination.

6. The computer-implemented method according to claim 1, wherein the one or more tire-specific time constants comprises a first time constant corresponding to a cooling state of the tire and a second time constant corresponding to a heating state of the tire.

7. The computer-implemented method according to claim 6, further comprising predicting the second temperature value at least in part by selecting the first time constant or the second time constant based on at least a determined vehicle speed.

8. The computer-implemented method according to claim 1, further comprising implementing the predicted vertical load as an input to a tire wear prediction model.

9. The computer-implemented method according to claim 8, further comprising predicting a replacement time for the tire, based on a predicted tire wear status, as compared with one or more tire wear thresholds associated with the tire, wherein the one or more tire wear thresholds comprise a tire tread threshold corresponding to a given wheel position for the vehicle-tire combination.

10. The computer-implemented method according to claim 8, further comprising:
predicting a replacement time for the tire, based on a predicted tire wear status, as compared with one or more tire wear thresholds associated with the tire;
generating a vehicle maintenance alert comprising the predicted replacement time and an identifier associated with the vehicle-tire combination; and
transmitting a message comprising the vehicle maintenance alert to a fleet management device.

11. A system for predicting vertical load on a vehicle tire, the system comprising:
a data storage network having retrievably stored thereon the one or more thermal characteristics for a particular vehicle-tire combination, the thermal characteristics determined as corresponding to a range of temperature values further correlated with a plurality of operating conditions, the plurality of operating conditions comprising at least a vertical load;
a computing device functionally linked to the data storage network and further configured to
generate a model for predicting transient temperature behavior based on one or more tire-specific time constants, and
during operation of the vehicle-tire combination and responsive to at least a first temperature value, determine a predicted vertical load based on a predicted second temperature value from the model and further based on the retrievably stored one or more thermal characteristics.

12. The system of claim 11, wherein the plurality of operating conditions further comprise vehicle speed and tire inflation pressure, and the predicted vertical load is determined further based on inputs for vehicle speed and tire inflation pressure.

13. The system of claim 12, further comprising a tire-mounted sensor communicatively linked to the computing device and configured to sense a tire contained air temperature.

14. The system of claim 13, wherein the retrievably stored thermal characteristics are determined via a series of physical measurements of the range of temperature values and the correlated plurality of operating conditions.

15. The system of claim 13, wherein the retrievably stored thermal characteristics are determined via finite element modeling of the vehicle-tire combination.

16. The system of claim 11, wherein the one or more tire-specific time constants comprises a first time constant corresponding to a cooling state of the tire and a second time constant corresponding to a heating state of the tire.

17. The system of claim 16, wherein the second temperature value is predicted at least in part by selecting the first time constant or the second time constant based on at least a determined vehicle speed.

18. The system of claim 11, wherein the computing device is further functionally linked to a tire wear prediction model and configured to implement the predicted vertical load as an input thereto.

19. The system of claim 18, wherein the computing device is further configured to predict a replacement time for the tire, based on a predicted tire wear status, as compared with one or more tire wear thresholds associated with the tire, wherein the one or more tire wear thresholds comprise a tire tread threshold corresponding to a given wheel position for the vehicle-tire combination.

20. The system of claim 18, wherein the computing device is further configured to:
predict a replacement time for the tire, based on a predicted tire wear status, as compared with one or more tire wear thresholds associated with the tire;
generate a vehicle maintenance alert comprising the predicted replacement time and an identifier associated with the vehicle-tire combination; and
transmit a message comprising the vehicle maintenance alert to a fleet management device.

* * * * *